Patented Sept. 19, 1922.

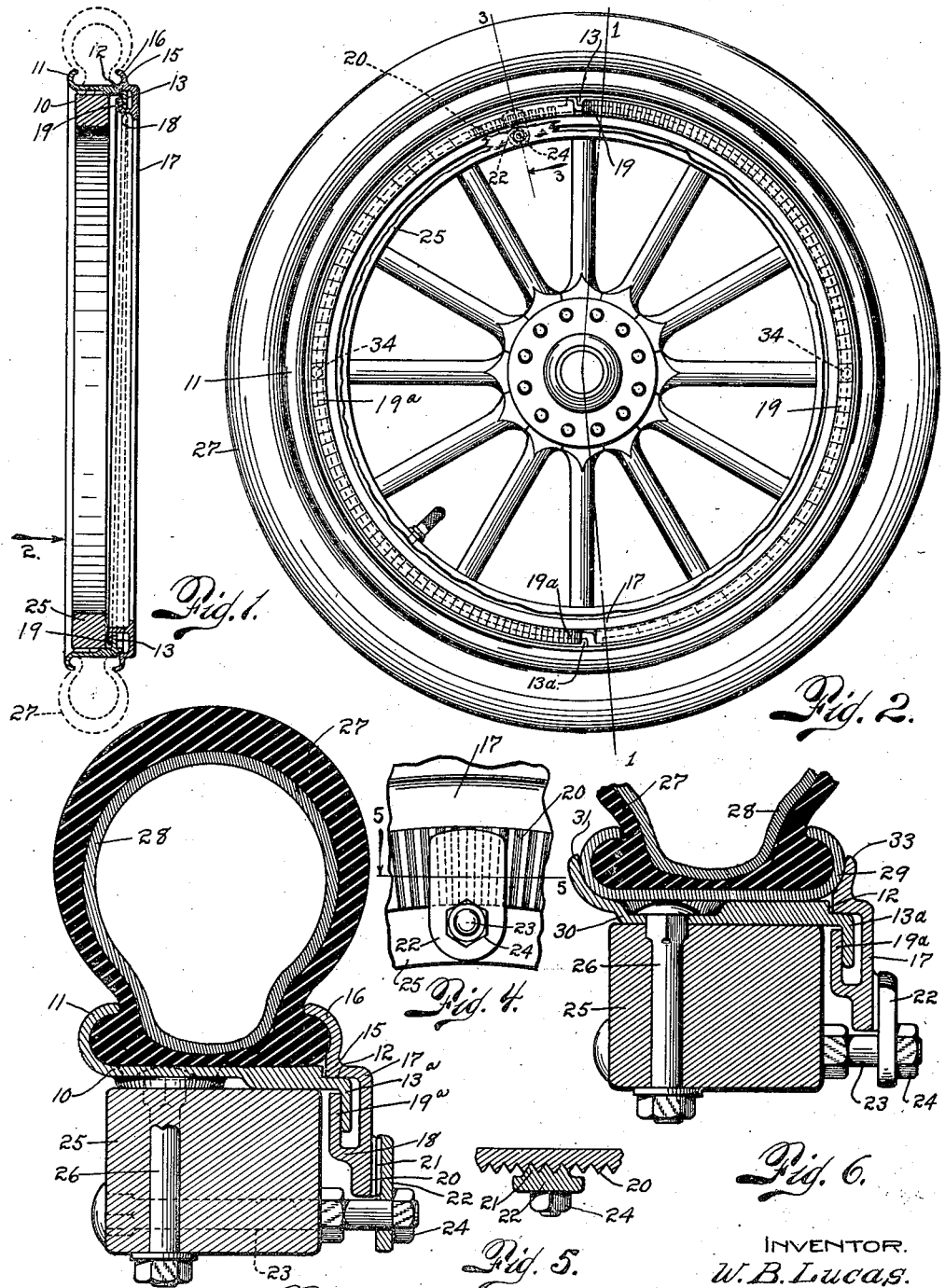

1,429,515

UNITED STATES PATENT OFFICE.

WALKER BLAINE LUCAS, OF HARLOWTON, MONTANA.

TIRE-MOUNTING RIM.

Application filed February 8, 1921. Serial No. 443,441.

*To all whom it may concern:*

Be it known that I, WALKER BLAINE LUCAS, a citizen of the United States, residing at Harlowton, in the county of Wheatland and State of Montana, have invented certain new and useful Improvements in Tire-Mounting Rims; and I do hereby declare the following to be a full, clear, and exact description of the invention, such as will enable others skilled in the art to which it appertains to make and use the same.

This invention relates to improvements in tire mounting rims, and has been especially devised to meet not only the more important needs of the user of automobiles, and analogous vehicles but also those of the garage or repair man, as well as that of the manufacturer, who ultimately cater to the user.

To those who have the occasion of removing and replacing pneumatic tires, or even cushion and solid rubber tires, with reference to automobile or analogous vehicle wheels, the difficulties and irksomeness of the task of prying off or on such tires, over their curved flanged supporting rims, is well understood.

Amongst other objects and advantages, which will clearly appear as incidental to the following disclosures, it may be said that the primary object of the present invention is to provide a tire mounting rim that is of simple and durable construction, and one which permits of the facile detachment and attachment of the tire to its felloe.

In an earlier application, filed by me on July 24, 1920, Serial Number 398,625, I have disclosed a divided tire mounting rim comprising a pair of annular sections, the inner peripheral edge face of one section being screw threaded to receive the removable section carrying an opposed flange element. My present invention, viewed from its broadest aspect, embodies a pair of bodily separable annular sections, comprising complementary elements that provide co-acting inclined faces, whereby one section may be partially inserted within the other section, after which, and upon substantially a half turn being made, the two sections are securely wedged together, with the tire clamped in position around the channeled periphery of the rim.

With these prefacing remarks, references will be immediately had to the accompanying drawings, illustrating a practical embodiment of the improvements, in which drawings—

Figure 1 is a vertical sectional view through my improved annularly divided rim, as applied to the felloe of a wheel, the section being taken along the line 1—1 of Figure 2;

Figure 2 is a side elevational view of an automobile wheel equipped with my improvements, looking in the direction of the arrow 2 of Fig. 1, and with the felloe broken away around its periphery, to show in face elevation one of the paired sets of oppositely inclining half-spiral segments;

Figure 3 is a cross-sectional view along the line 3—3 of Fig. 2;

Figure 4 is a fragmentary elevational view showing the auxiliary locking means for the annular rim sections;

Figure 5 is a cross-sectional view along the line 5—5 of Fig. 4; and

Figure 6 is a cross-sectional view, analogous to Fig. 3 but showing my improvements more particularly in connection with the support of a demountable rim.

10 designates the peripheral wall of one annular section of the improved separable rim, having the usual external curving flange 11 at its outer edge face, and towards its inner edge face the wall is slightly depressed to provide an annular seating recess 12, terminating in a pair of inturned flange elements 13 and 13ª that are formed as endwise extending reversed half spiral members, or semicircular reversely inclining planes or wedging surfaces.

15 designates the peripheral wall of the other annular section, which may be of less width than the wall 10 and seats down upon the annular recess 12 of the latter, in countersunk relation.

The external face of the wall 15 provides an annular inwardly curving flange 16, complementary to the flange 11, and terminates at its outer edge face in a right-angular annular flange strip or extension 17, which provides an inwardly projected annular neck or wall 18 that terminates in a pair of out-turned flange elements 19 and 19ª of reversed half spiral formation, analogous to but extending endwise in opposite directions to the half spiral members 13 and 13ª with which they co-operate in overlapped guiding, centering and locking registration when the rim section is given a half turn, as will later appear.

As a matter of fact, it may be said that the two rim sections are practically reversed duplicates in major respects, excepting as to dimensions, the neck or wall 18 of the inner section being concentric with the wall 10 and providing its half spiral segments as complemental elements to the half spiral segments of the other rim section.

While the specific means illustrated may not be essentially requisite to the broader invention, still I prefer to employ an auxiliary locking means for the separable rim sections after they have been firmly wedged home by the indrawing force of the complementally co-acting half spiral elements.

To this end, therefore, the lower outer face of the flange strip 17 may be provided with a serrated segment face 20, located at a suitable position around the flange strip, which is adapted to be engaged by an analogous serrated face 21 of a locking plate 22 that is apertured to be supported by the extended end of a bolt 23, secured to the wheel felloe, which plate 22 is controlled by a nut 24, as will be obvious.

Thus far the essential features of the invention have been described with particular reference to its application to a wheel felloe where a demountable rim, in its true sense, is not employed, and, as illustrated at Figure 3, the section 10 is permanently secured to the felloe 25 of the wheel as by radial bolts 26, which arrangement illustrates the mounting of a pneumatic tire, comprising the shoe 27 and inner tube 28, as clinched to the felloe by my improved separable rim.

Where a demountable rim is to be employed, as illustrated at Figure 6, the essential principles are the same, but the peripheral formations of the rim sections may be slightly altered, as will be apparent, to properly receive the demountable rim 29, carrying the pneumatic tire 27—28. In this figure the outer rim's annular wall is indicated at 30, with the circular flange 31. The parts are otherwise indicated as in Figure 3, excepting for the other curved flange which is designated at 33, and the illustration of a demountable rim 29.

In operation, and assuming that the rim section 10 is bolted to the felloe as indicated at Figure 3, and with the inner rim section not as yet applied, it will be obvious that the tire 27—28 may be readily slipped over the supporting wall 10 and up against the inwardly curved annular flange 11. When thus initially mounted, it will be seen that the inner section may be laterally inserted as a bodily whole partially within the outer rim section, and by making substantially a one half turn thereof the same will be drawn inwardly towards the outer section, causing the inwardly curved flange 16 to securely clinch the tire, owing to the co-acting wedging engagement of the complemental half spiral members 13, 13ª, 19 and 19ª. This turning of the inner rim section may be accomplished in any suitable way, and for this purpose I have simply indicated a diametrically opposed pair of sockets 34 to take a spanner tool.

When the section has been given a substantially half turn, as just referred to, that in itself will securely wedge the parts together, for firmly clinching the tire in place, but additional security is insured by causing the toothed face 21 of the locking plate 22 to engage the serrated segment face 20 and be tightened up thereagainst by the nut 24. To remove a tire, it is obvious that this may readily be done by reversing the operations thus described.

With reference to Figure 6, it will be seen that the operations, in so far as my invention is concerned, are substantially identical with the foregoing disclosure.

It is believed that the advantages of all of the features, as hereinbefore brought out, will be quite apparent to the users of automobiles, garage men, manufacturers and others engaged in the industry, but it may also be finally emphasized that, by my improvements, it is not necessary to employ the usual series of tie-bolts, with their paired clamping lugs, as heretofore employed.

While I have thus disclosed certain preferred embodiments of my invention, it may later be found to be expedient or desirable to make some alterations in the structural form and arrangement of the parts, but without departing from the spirit of the invention, and it will be understood, therefore, that I do not necessarily restrict myself to all of the details exactly as disclosed, excepting as they may come within the terms of the ensuing claim, when fairly interpreted in the light of the specification, if necessary, or equivalent features.

What I do claim, as new and patentable, is:

An annularly divided tire mounting rim embodying a main annular section and an auxiliary annular section, each of which provides reversely paired internal half spiral elements that are suitably spaced and complementally adapted for interlocked wedging engagement, when said auxiliary section is fitted laterally within said main section and given a substantially half turn therein in one direction, and being correspondingly released for bodily removal upon a substantially half turn in the reverse direction.

In testimony whereof, I affix my signature.

WALKER BLAINE LUCAS.